United States Patent [19]

Cretin et al.

[11] Patent Number: 4,862,425
[45] Date of Patent: Aug. 29, 1989

[54] DEVICE FOR ACQUIRING SEISMIC DATA IN A BOREHOLE AND TRANSMISSION THEREOF TO A CENTRAL CONTROL AND RECORDING SYSTEM

[75] Inventors: Jacques Cretin, Le Chesnay; Jean-François Therond, Neuilly S/Seine; Daniel Saussier, Aubergenville, all of France

[73] Assignee: Institut Francais du Petrole, Rueil-Malmaison, France

[21] Appl. No.: 177,476

[22] Filed: Apr. 1, 1988

[30] Foreign Application Priority Data

Apr. 2, 1987 [FR] France .............................. 87 04677

[51] Int. Cl.$^4$ ............................................. G01V 1/40
[52] U.S. Cl. ...................................... 367/33; 367/13; 340/860; 364/422
[58] Field of Search ....................... 367/26, 33, 81, 13, 367/911; 340/853, 857, 858, 859, 860; 364/422; 181/104, 105

[56] References Cited

U.S. PATENT DOCUMENTS 4,428,422  1/1984  Laurent ................................ 166/212
4,556,884 12/1985  Howells et al. ...................... 340/860
4,616,703 10/1986  Laurent et al. ..................... 166/66.4

FOREIGN PATENT DOCUMENTS 203227 12/1986 European Pat. Off. .
2282684 3/1976 France .
2005865 4/1979 United Kingdom .

Primary Examiner—Thomas H. Tarcza
Assistant Examiner—Ian J. Lobo
Attorney, Agent, or Firm—Antonelli, Terry & Wands

[57] ABSTRACT

A device is provided for acquiring data coming from sensors distributed in several probes which may be anchored in a well or borehole and transmission thereof to a central control and recording system, including a remote control assembly for checking operating parameters. An acquisition apparatus includes a main multiplexer for seismic channels and an auxiliary multiplexer. The control assembly includes different modules delivering signals indicative of the position of the anchorage arms, of the operating temperature, of the power supply voltage, etc, means for testing the sensors and the seismic channels, and means for detecting any malfunction in the advance of the probes along the borehole. Different lines connected to the auxiliary multiplexer transmit the signals delivered by the control assembly.

17 Claims, 6 Drawing Sheets

DEVICE FOR ACQUIRING SEISMIC DATA IN A BOREHOLE AND TRANSMISSION THEREOF TO A CENTRAL CONTROL AND RECORDING SYSTEM

BACKGROUND OF THE INVENTION

1. Field of the Invention

The invention relates to a system for the acquisition of data measured in a well or borehole and more particularly seismic data.

The acquisition of measurement data in a borehole is generally achieved by lowering therein one or more probes suspended from a multifunction cable. The probe has an elongate body and one or more mobile arms.

Hydraulic jacks move each arm from a rest position against the body of the probe to an open position in which they are anchored in the wall of the borehole and thus immobilize the probe. Hydraulic circuits connect the jacks to means for delivering pressurized fluid generally comprising an electric motor and electrovalves.

2. Description of the Prior Art

The multi-function cable very often comprises a plurality of conducting lines for transmitting electric currents for supplying the motor and for signals of any kind. It is a question for example of control signals transmitted to the probe from a laboratory at surface as well as response signals sent from the probe. The response signals are formed either by monitoring or test signals, or data measured by the sensors of the probe. Such a probe is described for example in U.S. patent 4,428,422.

A probe may for example also be used having anchorage arms actuated by springs held under tension by bolts during lowering. Hydraulic means comprising electrovalves are used for unlocking and opening the arms.

The electrovalves are actuated by control signals received through the multi-function cable. Such a probe is described for example in U.S. patent 4,616,703.

The different sensors lowered into the well for making measurements of different kinds may be included in a single probe or else in a set of probes comprising a main probe under which a plurality of satellite probes are suspended at different depths. Such an assembly of probes is described for example in French patent FR-2 564 599.

Seismic prospection operations are for example carried out by disposing in wells a plurality of sensors adapted for detecting waves reflected by the discontinuities of the subsoil, coming from a seismic source disposed on the surface or in the vicinity thereof or else in another well. The signals received are used so as to obtain seismic cross sections of the subsoil.

The seismic sensors are generally directional and oriented in one or more directions perpendicular to each other. They are disposed in an assembly of several probes so as to pick up the seismic signals received at different depth levels and are connected to a surface laboratory, either directly by a special line included in the multi-function cable, or by means of a seismic acquisition apparatus;

In this latter case, the different signals are collected, sampled, digitized and transmitted through one or more lines of the multi-function cable in coded form. After decoding, they are recorded and processed by a seismic laboratory.

Increasing the number of sensors and probes required for the seismic prospection in boreholes, makes the lowering operations, positioning and checking of the correct operation of the apparatus more and more complex. This is all the more so that operations are carried out at considerable depth under harsher temperature and pressure conditions.

A conventional method for monitoring the lowering of a single probe in a well consists in checking the tension of the support cable. A stop in the advance causes tension discontinuities which are readily detectable. When a reception device is used comprising several probes, this detection method is practically no longer possible for the variations of tension caused by stopping the single satellite probe at the head of the advance are much smaller. In the case of late detection, the borehole risks being jammed which is difficult to resolve.

SUMMARY OF THE INVENTION

The device of the invention makes it possible to acquire seismic data in a borehole and transmit it to a central control and recording system disposed outside the borehole while offering the possibility of monitoring and carrying out tests on the reception and acquisition equipment.

It includes a reception assembly having a plurality of seismic sensors disposed in at least one probe lowered into the borehole at the end of a cable having several transmission lines, said probe comprising anchorage arms associated with hydraulic pressure means controlled from the central system and an acquisition apparatus adapted for collecting the signals received by the different sensors and transmitting them to the central system in the form of multiplexed and digitized signal samples over the transmission lines of said cable.

It is characterized in that it comprises a control assembly having means for monitoring the advance of the reception assembly along the borehole and means for intermittently connecting the control assembly with the acquisition apparatus and ensuring transfer to the central system of the signals generated by said control assembly.

The control assembly for example includes means for determining the position of the anchorage arms.

It may also include means for testing the different sensors and the acquisition apparatus before carrying out seismic data acquisition cycles.

The means for monitoring the advance of the reception assembly along the borehole include for example a level (or energy) comparator for detecting signals received by the central system and coming from said sensors, whose amplitude becomes less than a predetermined threshold value.

The control assembly included in the device of the invention makes it possible to monitor the reception assembly during its movement along the borehole, to check it is correctly anchored and to carry out numerous measurements in situ for testing its operation before carrying out data acquisition cycles or during these cycles.

Thus, obtaining and interpreting seismic recordings in the wells are thereby facilitated.

BRIEF DESCRIPTION OF THE DRAWINGS

Other features and advantages of the device of the invention will be clear from reading the following description of embodiments given by way of non limitative examples, with reference to the accompanying drawings in which.

DESCRIPTION OF THE PREFERRED EMBODIMENTS

Seismic prospection of the subsoil may be carried out by lowering a single probe or more generally a set of probes into a bore hole at the end of a multi-function electric carrying cable 2.

Figure 2:
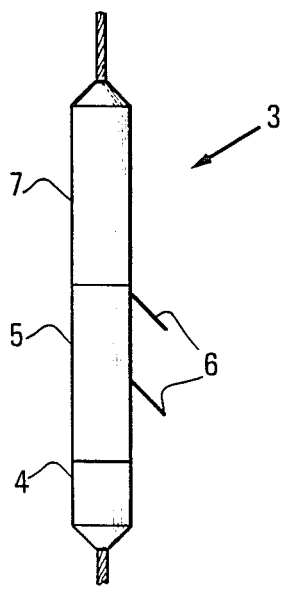
FIG. 2 shows the main probe in greater detail.

At the head is disposed a main probe 3 of the type described for example in the above mentioned U.S. patent 4,428,422 which has (FIG. 2) a body with several compartments. In a lower compartment 4 one or more seismic sensors are housed. It may for example be a question of directional geophones associated in threes so as to pick up waves polarized in three orthogonal directions (tri-axial geophones).

In a middle compartment 5 is disposed a hydraulic unit supplying jacks for controlling the two mobile arms 6 movable between a position folded back against the body and an opened out position in which they anchor themselves in the wall of the borehole and apply the probe body against the diametrically opposite wall. In another compartment 7 is disposed an electronic data acquisition apparatus which will be described in connection with FIG. 4.

Under the main probe are suspended one or more satellite probes 8 having at their lower end a compartment 9 for one or more seismic sensors. In the other part is disposed a control mechanism (not shown) for triggering opening of a mobile arm 10, for anchoring the satellite probe against the well wall.

This mechanism comprises for example a spring and a bolt which may be remote controlled. Such a satellite probe is described for example in the above U.S. patent 4,616,703 or French Patent 2 564 599.

The multi-function cable 2 connects the probe or probe set to a surface installation having a support structure 11 with a handling drum 12 associated with drive means (not shown).

Figure 3:
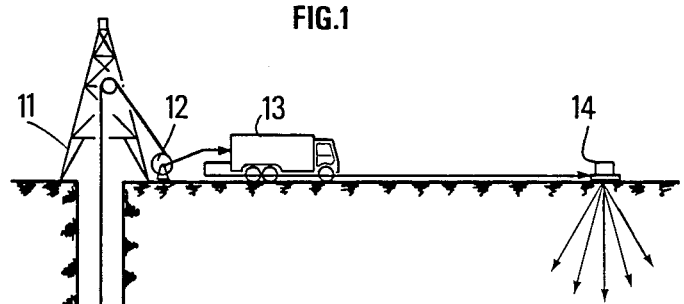
FIG. 3 shows schematically the section of an electric carrying cable connecting the reception assembly to the surface.
Figure 3:
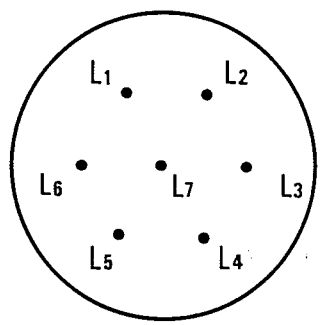

The multi-function cable 2 is of a current type and includes (FIG. 3) seven conducting lines ($L_1 \ldots L_7$) and an external metal sheath. Through the cable electric current is transmitted for operating a motor causing the pressurization of a hyraulic liquid required for operating the jacks and intermittent currents for opening or closing control electrovalves. Other lines of cable 2 are used for transmitting control signals and data, as will be seen hereafer.

Cable 2 is connected to a vehicle 13 containing a central control and recording system. A seismic source 14 is disposed at the surface and on a command from the central system emits seismic waves which are transmitted into the ground. The different signals received by the different sensors lowered into the wells are connected by the data acquisition apparatus disposed in the main probe 3 and transmitted to the central system.

Figure 4:
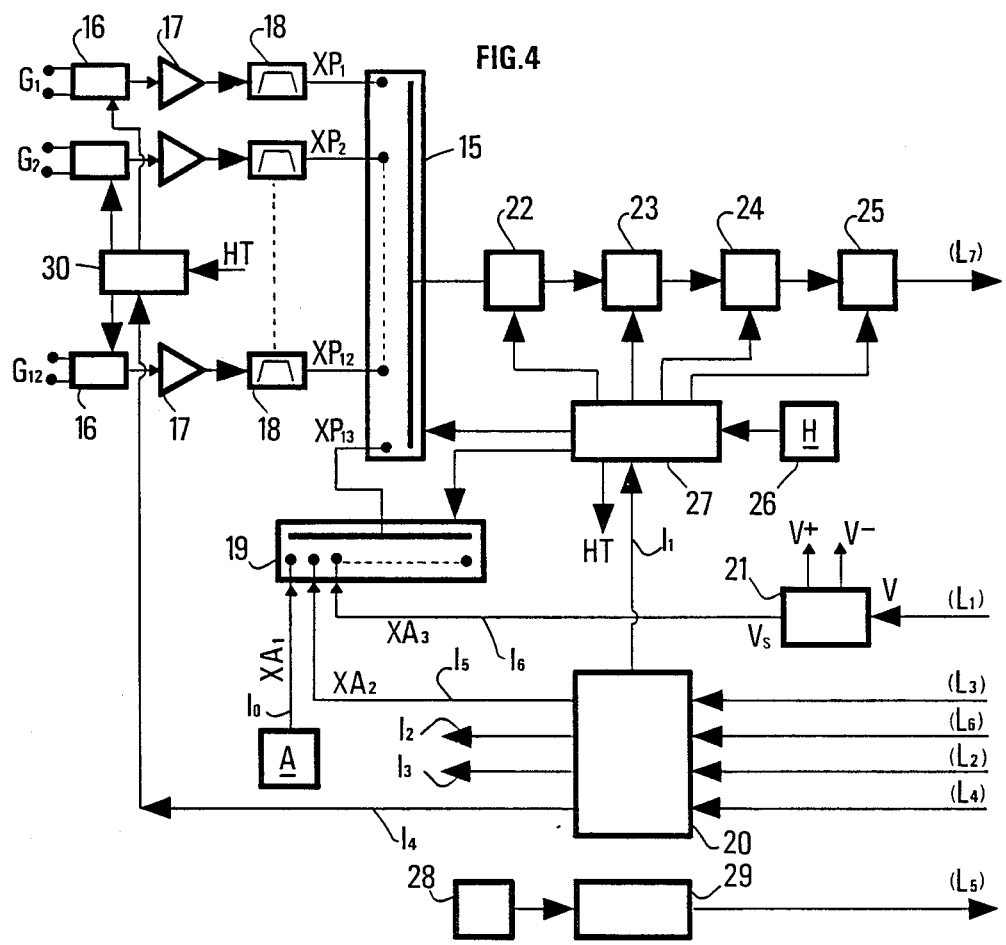
FIG. 4 is a block diagram of the acquisition apparatus and of the control assembly disposed in the main probe.

The data acquisition apparatus shown schematically in FIG. 4 includes a main multiplexer 15 having 12 inputs reference respectively XP1 to XP12 to which seismic signals or test signals are applied.

These signals are produced by 12 identical circuits connected respectively to seismic sensors $G_1$ to $G_{12}$. Each of them includes a test element 16 (shown in greater detail in FIG. 7) whose input is connected to a seismic sensor $G_1$ to $G_{12}$ and whose output is connected to a fixed gain preamplifier 17. The amplified signals are applied respectively to band pass filtering units 18 centered on the frequency band of the seismic signals.

The outputs of the filtering units 17 are applied to the inputs XP1 to XP12 of the main multiplexer 15.

An additional input XP13 of the multiplexer is connected to the output of an auxiliary eight channel multiplexer 19. To the inputs of the auxiliary multiplexer 19 relatively slow varying signals are applied.

Figure 5:
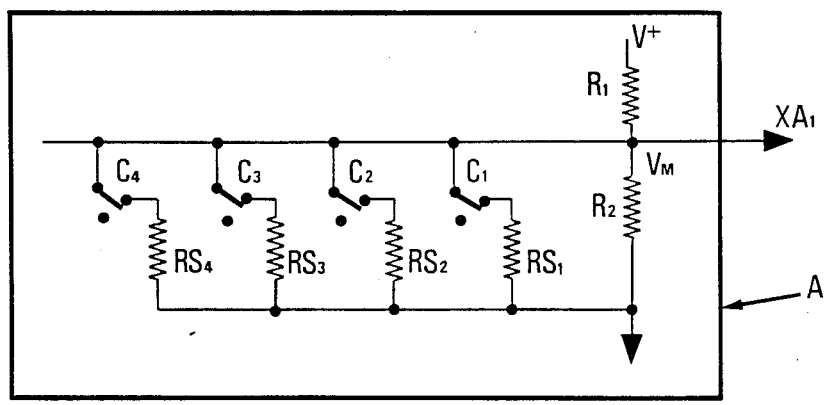
FIG. 5 shows schematically a detector detecting the opening of the anchorage arms.

To one of them XA1, over a line $l_0$, an electric voltage for example is applied representative of the state of the anchorage arms of the satellite probes. This voltage is delivered by a variable potentiometric divider (FIG. 5) formed of a first fixed resistor $R_1$ and a variable resistor formed of a fixed resistor $R_2$ connected in parallel across an additional resistor $RS_1$, $RS_2$, $RS_3$ or $RS_4$ by switching switches $C_1$, $C_2$, $C_3$, $C_4$.

Figure 6:
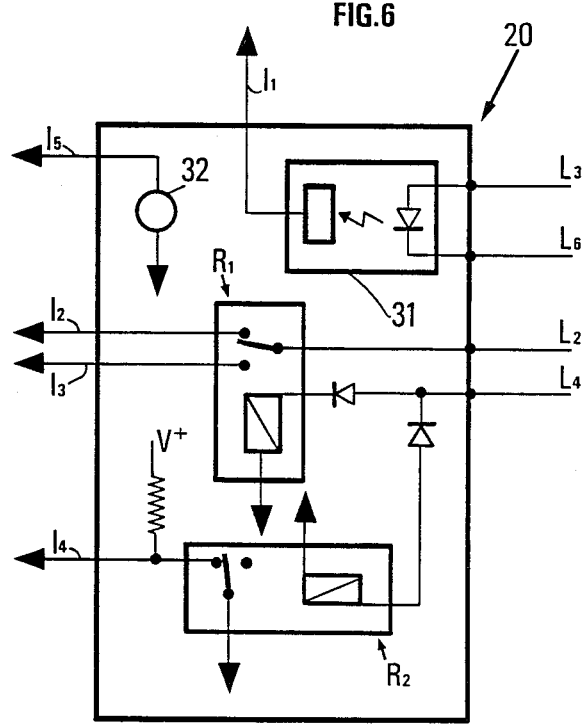
FIG. 6 shows schematically an interface assembly disposed in the main probe.
Figure 10:
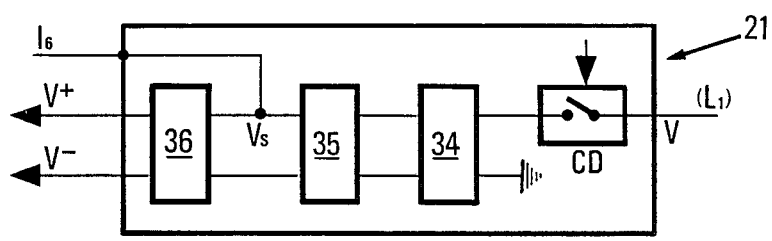
FIG. 10 shows schematically an electric supply unit.

Switching for connecting a new resistor in parallel is obtained by opening the anchorage arm or arms of the three sattelites. With the potentiometric divider connected between a supply voltage + and ground, the electric voltage at its middle point $V_m$ is representative of the number of anchorage arms open and so shows whether the set of probes is suitably immobilized in the bore hole before any acquisition operation. For two other inputs XA2, XA3 of the auxiliary multiplexer 19, and over two lines $l_5$ and $l_6$ respectively, are applied signals representing an operating temperature delivered by a sensor disposed in an interface assembly (FIG. 4) and an electric voltage delivered by an electric supply unit 21, these signals and this electric voltage optimizing the operation of the power supply, as will be seen in greater detail further on in connection with FIGS. 6 and 10.

The output of the main multiplexer 15 is connected to an acquisition chain including a variable gain amplifier 22 of the type described for example in the published French patent applications No. 2 593 004 or 2 592 537.

The amplified signals are sampled and digitized in an A-D converter 23. The digitized samples are then coded by a specialized circuit 24 in a bipolar code such as the code HDB 3 well known to transmission specialists, before being applied to a transmission element 25. The output of this element is connected to line $L_7$ of the multi-function cable 2.

A clock signal H produced by an oscillator 26 is applied to a logic timing unit 27 producing signal sequences for controlling the two multiplexers 15 and 19 and the acquisition chain 22 to 25.

Sensors 28 are disposed in the main probe for measuring the pressure in the hydraulic circuits. The signals which they generate are applied to an electronic interface module 29 and permanently transmitted over a line $L_5$ of the transmission cable.

Figure 7:
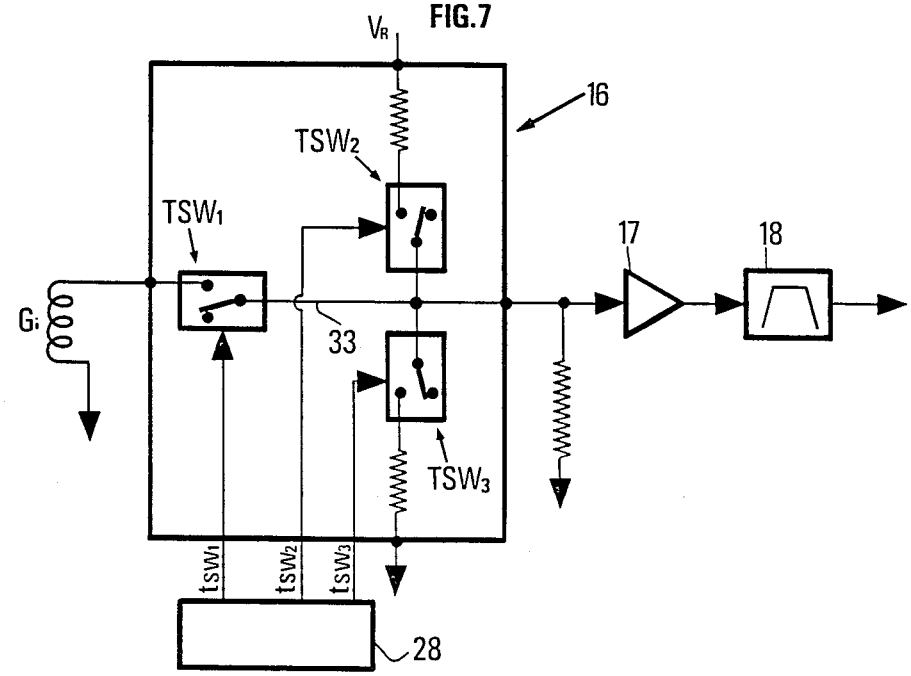
FIG. 7 shows schematically an element for testing the sensors and the seismic channels.

A test synchronizer 13, whose function will be described in connection with the FIG. 7, is used for sequentially commanding tests over the 12 multiplexed seismic channels, from a signal HT generated by the logic timing unit 27.

The power supply unit 21 is connected to a power supply line $L_1$ of the transmission cable. The lines $L_2$, $L_3$, $L_4$ and $L_6$ of this same cable are applied to the interface unit 20.

The interface unit 20 includes (FIG. 6) an optoelectronic coupler 31 connected to lines $L_3$ and $L_6$ of the cable and receiving thereover a timing signal for timing the multiplexer and the acquisition chain and which defines a time "window" during which signal acquisition is carried out.

The signal from coupler 31 is applied by a line $l_1$ to the logic unit 27 (FIG. 4). The line $L_2$ transports a power supply current. A first relay $R_1$ applies it either to the motor of the main probe over a line $l_2$, or to the elctrovalves of the satellite probes over a line $l_3$.

Figure 8:
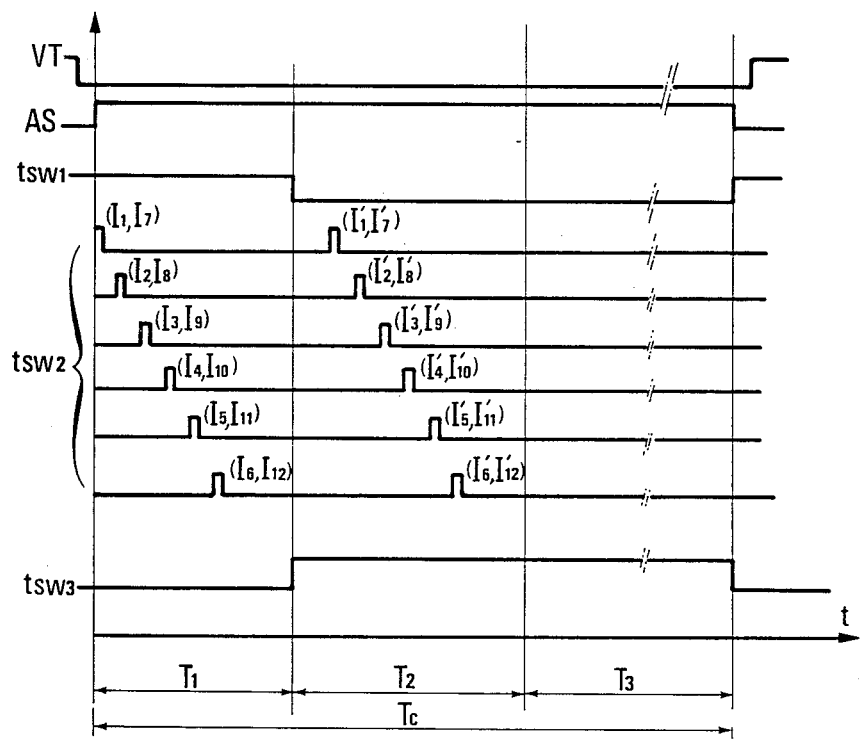
FIG. 8 shows timing diagrams of signals applied to the test elements.

A second relay $R_2$ intermittently applies a zero voltage to a line $l_4$ connected to a control input of the timer 30 (FIG. 4), the voltage discontinuity times defining a test validation window VT (FIG. 8).

A temperature sensor 32 is disposed in the interface unit 20. The signals which it produces are applied over a line $l_5$ to the input XA2 of the auxiliary multiplexer 19.

Tripping of the first relay $R_1$ and of the second relay $R_2$ is controlled by a single line $L_4$ to which is applied either a positive voltage, or a negative voltage, or a zero voltage.

The test unit formed of timer 30 and elements 16 (FIG. 4) makes it possible to sequentially check the correct operation of sensors $G_1$ to $G_{12}$ and of the associated seismic channels. Each of the test elements 16 comprises (FIG. 7) a circuit 33 permanently connected to the input of one of the preamplifiers 17 and, through an electronic switch TSW 1, with a transducer $G_i$ ($i=1$ to 12). Two other switches of the same type TSW2 and TSW3 respectively connect circuit 33 to a reference voltage $V_R$ and to ground, through resistors.

The three switches of the same element 16 are actuated by control signals tsw1, tsw2, tsw3 coming from the timer 30. These signals are generated from clock signals HT generated by the logic timing assembly 27.

Each test sequence is defined by the signal VT of duration $T_C$ (FIG. 8) received at the timer over line $l_4$ (FIG. 4). This sequence includes a first test of the different sensors $G_1$ to $G_{12}$ distributed in two groups.

A first group includes the sensors $G_1$ and $G_6$ and the second one the sensors $G_7$ to $G_{12}$. A signal tsw1 is applied simultaneously to all the switches TSW1 so as to connect the sensors $G_1$ to $G_{12}$ to the input of their respective preamplifier 17. This connection is permanent outside the test periods.

With the switches TSW3 remaining open (tsw3 is at the low level), the switches TSW2 are then closed for a first time in sequence in twos for a short time so as to apply current pulses $I_1$ to $I_{12}$ respectively to the sensors $G_1$ to $G_{12}$.

The pulses $I_1$ and $I_7$ are simultaneous, and likewise the pulses $I_2$ and $I_8$ or $I_3$ and $I_9$, etc.

Figure 9:
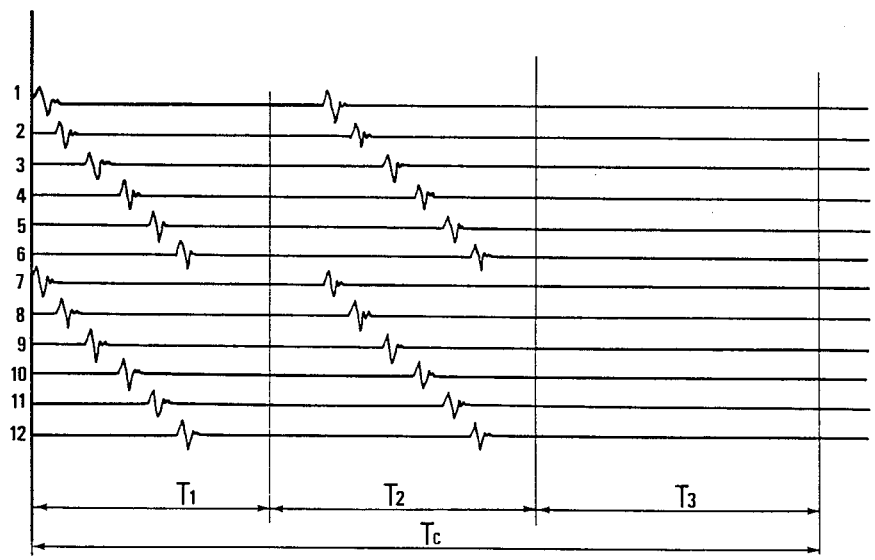
FIG. 9 shows the distribution as a function of time of the signals received by the central system in response to tests carried out on the sensors and the seismic channels.

The response signals $V_1, V_2 \ldots ; V_{12}$ of the different sensors (FIG. 9) are transmitted in twos to the main multiplexer 15, applied to the acquisition chain 22 to 25 and transmitted to the surface control and recording system over the line $L_7$ (FIG. 4). The operator may then detect possible causes of breakdowns.

After the first time interval $T_1$ the signal tsw1 is placed at the low logic level, the signal tsw3 at the high logic level so as to disconnect the different sensors $G_1$ to $G_{12}$ from their associated seismic channels and to connect a given resistor in parallel across the input of the preamplifiers 17.

As before, the switches TSW2 are then closed sequentially and in twos so as to apply current peaks $I'_1$ to $I'_{12}$ to the 12 seismic channels. The pulses $I'_1$ and $I'_7$ are simultaneous. The same goes for pulses $I'_2$ and $I'_8$, $I'_3$ and $I'_9$ etc. The responses $V_1$ to $V_{12}$ of the different seismic channels are applied in twos to the main multiplexer 15 and through the acquisition chain 22 to 25 and are transmitted to the central surface system. This second step lasts for a period of time $T_2$.

By analysing the response signals passing through the bandpass filters 18, their cut off frequencies and their respective slopes can be checked.

During the third part $T_3$ of the test cycle, the switches TSW1 and TSW3 of the different elements 16 are left in the same state and, in the absence of any applied signals, the electronic background noise generated by the different seismic channels 17, 18 and the acquisition chain 22 to 25 can be measured.

The test sequences are carried out with variable periodicity, for example at each depth at which the reception device is immobilized, before carrying out one or more seismic data acquisition cycles.

The electric supply unit 21 comprises (FIG. 10) a power supply device of the chopper type connected to the line $L_1$. The DC voltage V applied to this line is transformed by a chopping switch CD, an electric transformer 34, a rectifier bridge 35 and voltage regulators 36 into two symmetrical voltages $V+$ and $V-$ for supplying the different electronic modules of the seismic acquisition apparatus;

A line $l_6$ is connected to the output of the rectifier bridge 35 and to another input XR3 of the auxiliary multiplexer 19. The value $V_S$ available at the output of the bridge is therefore regularly transmitted to the surface.

Thus, the unregulated DC voltage can be maintained at an optimum value. This voltage is proportional to the DC voltage present at the end of line $L_1$. Depending on the transmission cable used and its total length, the line losses may be more or less great.

By increasing the electric voltage applied to line $L_1$ from the central control system a suitable value $V_S$ can be re-established if the line losses are too high.

If the voltage $V_S$ on the other hand is too high, the voltage regulators 36 must dissipate a larger heat energy, which is all the more troublesome since well probes often operate at a great depth were the ambiant temperature is very high.

The surface operator may then take care to maintain $CV_S$ at a value which is not too high by lowering, if required, the DC voltage applied to the line $L_1$, in the case when the ohmic losses in the cable are lower.

Figure 1:
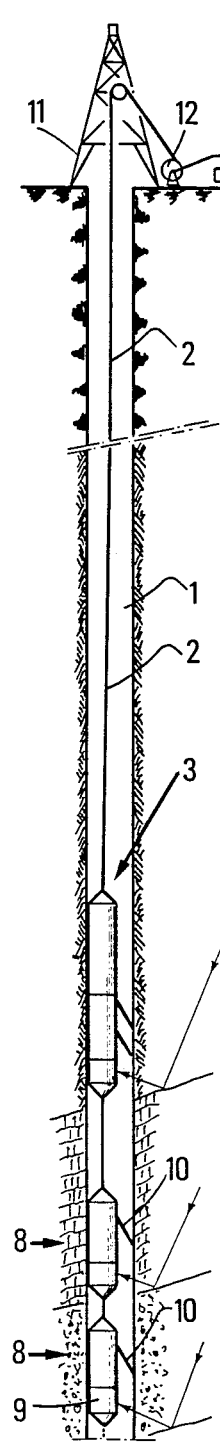
FIG. 1 shows a multiprobe reception assembly in a well.
Figure 11:
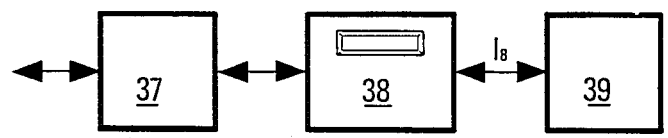
FIG. 11 shows a general block diagram of the control and recording system.

The central control and recording system disposed on the surface at the other end of the transmission cable 2 (FIG. 1) includes (FIG. 11) a control unit 37, a signal processing unit 38 for controlling and displaying the different functional sequences and a seismic data recording unit 39.

Figure 12:
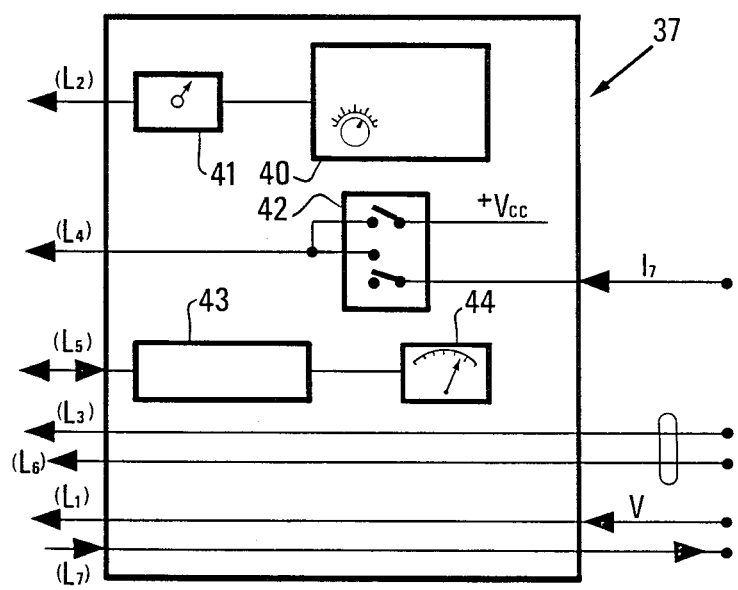
FIG. 12 shows a control unit included in the control and recording system.

The control unit 37 (FIG. 12) includes a power generator 40 connected through an ammeter 41 to the line $L_2$ supplying the motor and the electrovalves in the different probes. To the line $L_4$ is applied, depending on the position of a switch 42, either a positive voltage $V_{CC}$ which, by triggering the relay $R_1$ (FIG. 6) applies the electric power to the auxiliary probes 8, or a negative voltage applied over a line $l_7$ by the signal processing unit 38, this negative voltage triggering the relay $R_2$ (FIG. 6) when it is a question of carrying out tests.

An adaptation element 43 permanently receives the hydraulic pressure measurement signals transmitted over the line $L_5$ and applies them to a pressure gauge 44.

The purpose of the control unit 37 is to control the anchorage of the arms of the main probe, tripping those of the satellite probes and displaying supply voltages and hydraulic pressures.

The lines $L_1$, $L_3$, $L_6$, $L_7$ are connected directly through the control unit 36 to a terminal 41 of the processing unit 38. The same goes for the line $l_7$ coming from the control unit.

Figure 13:
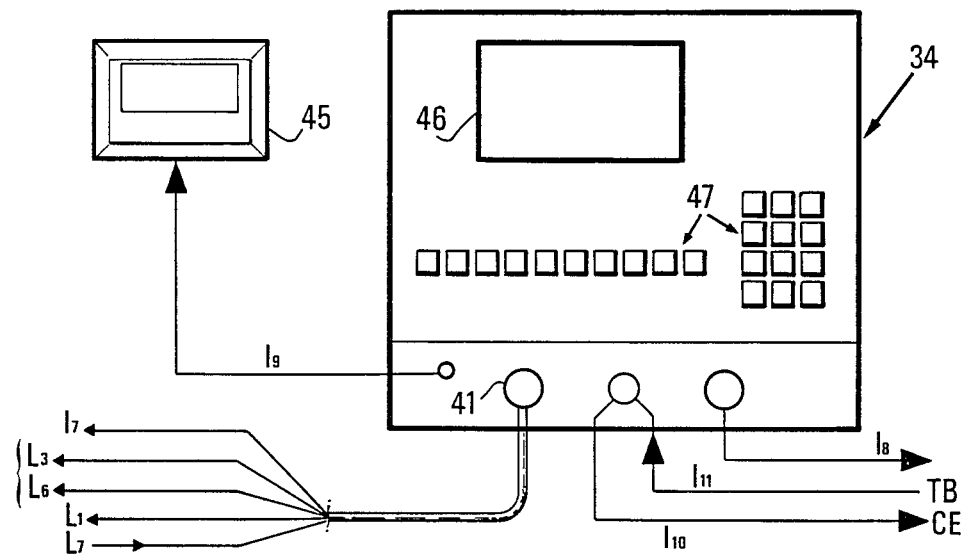
FIG. 13 shows a processing unit included in the same system.

Two lines $l_8$, $l_9$ connect the processing unit 38 respectively to the recording unit 39 (FIG. 11) and to an oscilloscope 45. A line $l_{10}$ transmits to a control "firing" box (not shown) a tripping signal CE. Over another line $l_{11}$ the processing unit 38 receives from the same box the signal TB marking the effective time of tripping the seismic source. A screen 46 (FIG. 13) displays the test, monitoring or seismic acquisition sequences in progress. Different programs may be selected by means of two keyboards 47.

Figure 14:
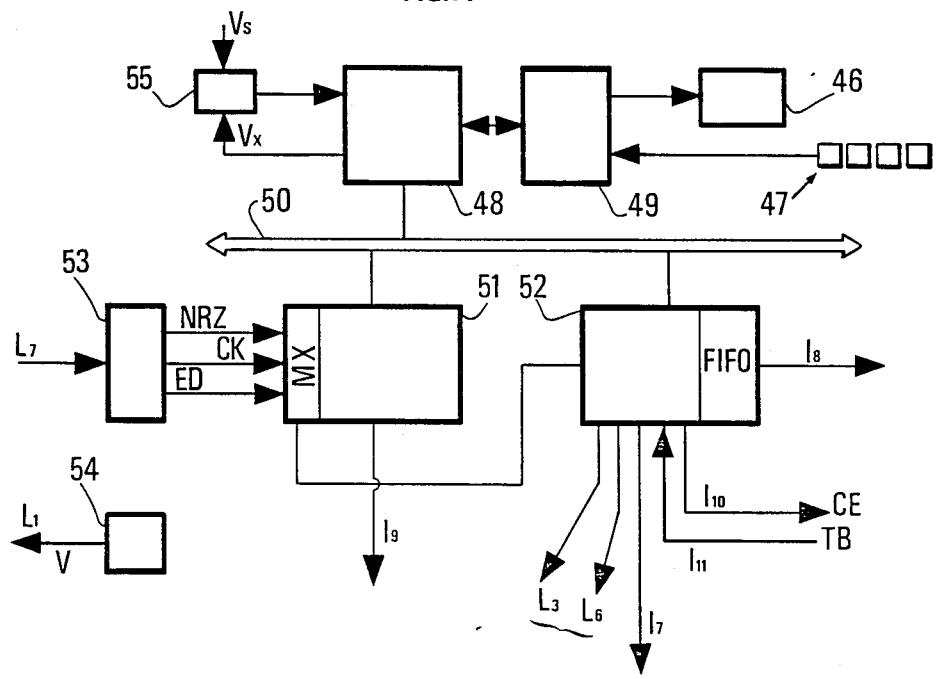
FIG. 14 shows a block diagram of the processing unit.

In the block diagram of FIG. 14, it can be seen that the processing unit 38 includes a microprocessor 48 communicating by means of an interface element 49 with the monitoring screen 46 and with the keyboards 47 and, through a "bus" 50, with an acquisition assembly 51 and an interface unit 52.

The acquisition assembly 51 is connected to the data transmission line $L_7$ through a reception module 53. This latter is adapted, on the one hand, for reshaping the coded signals arriving over line $L_7$ and, on the other hand, decoding them and checking them.

From the transmitted signals are extracted the data signals NRZ, a clock signal CK which was used in the acquisition apparatus of the main probe for timing the transmission and signals ED indicating as the case may be that transmission errors have been detected. The different signals extracted are applied to the acquisition assembly 51 which includes means for reconstituting in parallel form the digital "words" received in serial form, a DA converter and a buffer memory (these different elements have not been shown).

The acquisition assembly transmits in real time the signals from the 12 sensors reconverted in analog form to the oscilloscope 45, (FIG. 13) over the line $l_9$. The microprocessor 48 reads the buffer memory and transmits its contents to the interface unit 49 which adapts the format of the digital words before storing them in buffer memories of the FIFO type and transferring them to the recording unit 39 of the line $L_8$. The lines $L_3$, $L_6$, $l_7$, $l_{10}$ and $l_{11}$ extend from the interface unit 52.

The processing unit 38 further includes a power supply box 54 delivering the electric voltage V to line $L_1$ for supplying the electronic modules in the probes.

One of the features of the system of the invention is the use of the whole of the acquisition device for checking the assembly of probes during lowering thereof into the borehole.

The sensors $G_1$ to $G_{12}$ which react to the vibration and to the jerks to which the probes are subjected during lowering, generate signals of an amplitude much greater than that of the signals received during seismic acquisition periods. Under these conditions, any appreciable reduction of the signals generated by one or more sensors and more particularly by those contained in the deepest satellite probe, is therefore significant of unevenness of the advance.

By monitoring the amplitude of the different signals delivered by the sensors, the operator may therefore know whether the lowest probe (and possibly those which follow it) is slowed down or immobilized because of a reduction in signal amplitude.

An acquisition cycle is therefore carried out during lowering at given time intervals, every second for example, and the voltages $V_x$ transmitted by the different sensors are compared with a threshold voltage. This operation is carried out for example by a voltage comparator 55 connected to the microprocessor 48.

If one or more voltages drop below the threshold, the processing unit 34 then indicates on its screen 43 (FIG. 13) the number of the corresponding sensors ad so the probe in which an irregularity has occured, and warns the operator by a sound signal.

What is claimed is:

1. A device for the acquisition of seismic data in a borehole and transmission thereof to a central control and recording system disposed outside the borehole, including a reception assembly having a plurality of seismic sensors disposed in at least one probe lowered into a borehole at the end of a cable having several signal transmission lines, said probe comprising anchorage arms associated with hydraulic pressure means controlled from the central system and an acquisition apparatus adapted for collecting the signals received by the different sensors and transmitting them to the central system in the form of multiplexed and digitized signal samples over the transmission lines of said cable, said device further comprising:
 a monitoring assembly in said one probe and said central control and recording assembly, said assembly including means for testing signals from said seismic sensors when said probe is moving along the borehole, said signals being tested for detection of low level signals indicating unevenness in the progress of movement of said probe; and
 transmitting means for intermittently connecting said monitoring assembly with the control and recording assembly at least during progressing of movement of said reception assembly along the borehole and for monitoring progress of movement of said probe.

2. The device as claimed in claim 1, wherein the monitoring assembly also includes means for determining the position of the anchorage arms.

3. The device as claimed in claim 1, wherein the monitoring assembly further includes means for testing the different sensors and the acquisition apparatus including means for determining the amplitudes of said testing signals and means for indicating the detection of low level signals as a manifestation of a stoppage in the progress of movement of said probe.

4. The device as claimed in claim 1, wherein the central control and recording system includes a processing unit for processing the signals exchanged over the lines of said cable, and said monitoring assembly includes comparison means for detecting the signals transmitted through said cable to said central control and recording system from said sensors whose amplitude becomes less than a given threshold value upon stoppage in the progress of movement of said probe.

5. The device as claimed in claim 2, wherein the means for determining the position of the anchorage arms include an electric voltage divider having a resistor network associated with at least one switch triggered by the opening of the anchorage arms, the voltage delivered by the divider being applied to the acquisition apparatus.

6. The device as claimed in claim 3, wherein the acquisition apparatus includes amplification and filtering means connected to the different sensors and the means for testing the different sensors and the acquisition apparatus include test elements associated with a test synchronizer for intermittently applying calibrated signals to the sensors and to the amplification and filtering means, signals from said acquisition apparatus being transmitted to the central control and recording system whereby the acquisition apparatus alone and combined with said sensors are successively tested.

7. The device as claimed in claim 3, wherein the acquisition apparatus includes a power supply unit fed from the central control and recording system over a line of the cable and said monitoring assembly includes a line for applying to the acquisition apparatus an electric voltage taken from the power supply unit.

8. The device as claimed in claim 6, wherein each test element includes a first switch for intermittently connecting the associated sensor to the input of the amplification and filtering means and a second switch for applying a calibrated voltage to the input of the amplification and filtering means, and the test synchronizer includes logic elements for sequentially applying closure pulses to each second switch in test elements associated with at least one series of different sensors during a first time interval of closure of each first switch associated with all the sensors of the series, and for repeating an identical closure pulse sequence to the same each second switch during a second time interval thereby testing the response of said acquisition apparatus when connected to the sensors of said series and when disconnected from the same sensors, said central control and recording system including means for intermittently applying to a line of said cable a validation test order for said synchronizer.

9. The device as claimed in claim 8, wherein said acquisition apparatus includes signal multiplexing means, said monitoring assembly in said at least one probe being connected to one input channel at least of said multiplexing means.

10. The device as claimed in claim 1, wherein the acquisition apparatus includes amplification and filtering assemblies for amplifying and filtering the signals delivered by each of the sensors, multiplexing means for applying the signals coming from said assemblies to a seismic acquisition chain including an amplifier, an A-D converter, means for coding the digitized signals and means for transmitting the coded signals over a line of the transmission cable, said multiplexing means including at least one additional input for applying signals delivered by said monitoring assembly to the input of the seismic acquisition apparatus.

11. The device as claimed in claim 10, wherein the monitoring assembly in said at least one probe includes an electric voltage divider delivering a voltage whose value depends on the position of the anchorage arms of each probe, the voltage from the voltage device being applied to an input of the multiplexing means.

12. The device as claimed in claim 10, wherein the acquisition apparatus includes a power supply unit fed from the central system over a line of the transmission cable and the monitoring assembly includes a temperature sensor, this sensor and the power supply unit being connected to two input channels of the multiplexing means.

13. The device as claimed in claim 10, wherein the central control and recording system includes a processing unit for managing the signals transmitted on the lines of the transmission cable, said processing unit being adapted, for intermittently controlling the multiplexing means and the seismic data acquisition means during the advance of the reception assembly into the borehole, so as to measure the amplitude of the signals delivered by said seismic sensors.

14. The device as claimed in claim 10, wherein the multiplexing means include a main multiplexer connected to the amplification and filtering assemblies and an auxiliary multiplexer whose output is connected to an input of the main multiplexer, the control assembly being connected to the auxiliary multiplexer.

15. The device as claimed in claim 10 further including a test synchronizer means for applying the same closure pulse to each second switch of two different test elements.

16. Method for monitoring progress of movement of at least one probe as the probe is being lowered in a borehole at the end of a cable provided with several transmission lines, said probe containing a reception assembly comprising a set of seismic sensors, an acquisition apparatus for collecting signals received by said set of seismic sensors, for digitizing the received signals and for transmitting the digitized signals to a central control and recording system outside the borehole through the transmission lines of said cable, said method comprising testing the received signals when said one probe is moving along the borehole for detection of low level signals indicating unevenness in the progress of movement along the borehole of said one probe.

17. The method as claimed in claim 16 wherein the test step includes detecting high amplitude signals during normal progress of movement of the probe along the borehole and detecting lower amplitude signals when the lowering movement of said lowermost probe is interrupted.

* * * * *